A. FONTAINE AND C. VINCENT.
EGG POACHER.
APPLICATION FILED MAR. 18, 1921.
1,390,772. Patented Sept. 13, 1921.
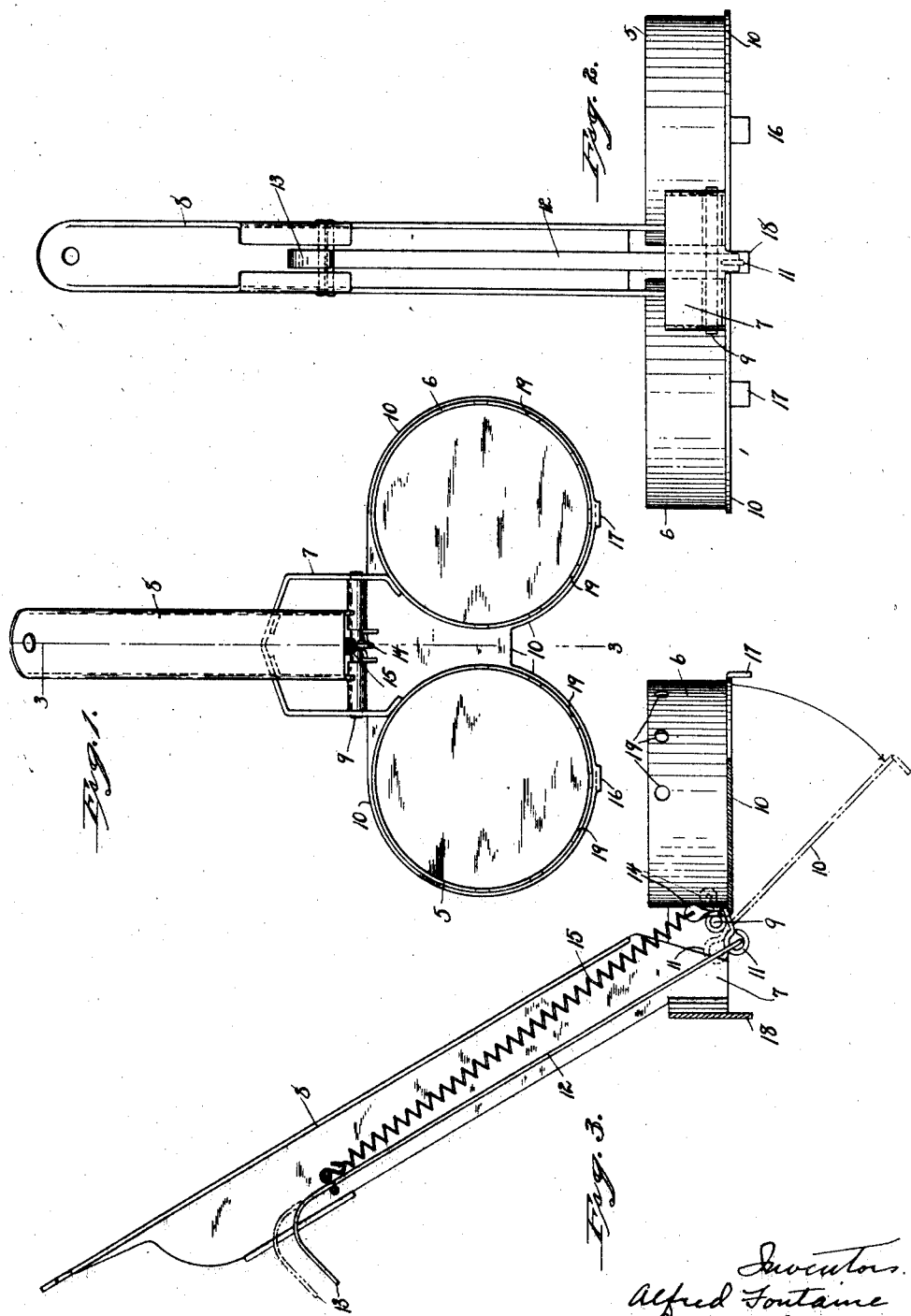

UNITED STATES PATENT OFFICE.

ALFRED FONTAINE, OF BRIDGEPORT, AND CHARLES VINCENT, OF NEW HAVEN, CONNECTICUT.

EGG-POACHER.

1,390,772.  Specification of Letters Patent.  Patented Sept. 13, 1921.

Application filed March 18, 1921. Serial No. 453,350.

*To all whom it may concern:*

Be it known that we, ALFRED FONTAINE, a citizen of the United States, residing at Bridgeport, in the county of Fairfield and State of Connecticut, and CHARLES VINCENT, a citizen of the United States, residing at New Haven, in the county of New Haven and State of Connecticut, have invented a new and useful Improvement in Egg-Poachers; and we do hereby declare the following, when taken in connection with the accompanying drawings and the characters of reference marked thereon, to be a full, clear, and exact description of the same, and which said drawings constitute a part of this application, and represent, in—

Figure 1, a plan view of an egg poacher constructed in accordance with our invention.

Fig. 2, a rear view of the same.

Fig. 3, a sectional view on the line 3—3 of Fig. 1.

This invention relates to improvement in egg poachers, the object being a simple construction from which the eggs, when poached, may be readily removed, and the invention consists in the construction and arrangement of parts as hereinafter described and particularly recited in the claims.

In carrying out our invention as shown, we employ two rings 5 and 6, connected together by a yoke 7, so as to stand side by side in the same horizontal plane. Connected with the yoke is an upwardly-extending handle 8 and mounted in the yoke is a pin 9. Hinged to the pin 9 is a bottom-plate 10 like two disks corresponding to the rings 5 and 6 and adapted to close the bottoms of said rings. This plate is provided at its rear with a downwardly-turned arm 11, which is connected to a rod 12 extending upward through the handle and provided at its outer end with a finger-piece 13. The plate is also provided with an upwardly-projecting arm 14 to which a spring 15 is attached, the other end of the spring being fixed to a point within the handle. Preferably and as shown, the plate is formed at its forward edge with two downwardly-projecting legs 16 and 17, and the yoke with a corresponding leg 18, so that the device, when placed into a pan of water, will stand above the bottom of the pan. The rings are also preferably formed near their upper edges with a series of perforations 19, through which water may escape when the eggs are cooked.

The device is used in the usual manner of articles of this character, that is, it is placed in boiling water and the eggs dropped into the rings. When the eggs are cooked, the device is removed and a pull upon the finger-piece 13 will drop the plate 10 away from the rings, so that the eggs resting on the plate may be removed to a suitable dish. Before moving the plate, water held by the rings may be poured off through the perforations 19. When the finger-piece 13 is released, the spring 15 will re-act to draw and hold the plate against the lower edges of the rings.

We thus provide a very simple device for the purpose described.

We claim:

1. An egg poacher comprising rings suitably connected together and provided with an upwardly-extending handle, a hinged-plate adapted to close the bottoms of said rings, a rod connected with said plate and extending upward through said handle and provided with a finger-piece, by which the plate may be moved, and a spring tending to hold the plate against the lower edges of the said rings.

2. An egg poacher comprising rings suitably connected together and provided with an upwardly-extending handle, said rings each provided near their upper edges with a series of perforations, a hinged-plate adapted to close the bottoms of said rings, a rod connected with said plate and extending upward through said handle and provided with a finger-piece, by which the plate may be moved, and a spring tending to hold the plate against the lower edges of the said rings.

3. An egg poacher comprising rings, a yoke connecting the same, a handle connected with the yoke and extending upwardly therefrom, a plate adapted to close the lower edges of said rings, said plate formed with a downwardly-extending arm and with an upwardly-extending arm, an operating rod connected with the downwardly-extending arm, and a spring connected with the upwardly-extending arm and adapted to hold the plate against the lower edges of the said rings.

In testimony whereof, have signed this specification in the presence of two subscribing witnesses.

ALFRED FONTAINE. [L. S.]
CHARLES VINCENT. [L. S.]

Witnesses:
GEORGE W. RUCKOLDT,
EMIL F. STEPHAN.